W. J. P. MOORE.
STEERING KNUCKLE.
APPLICATION FILED APR. 28, 1916.

1,234,923.

Patented July 31, 1917.
2 SHEETS—SHEET 1.

Inventor
William J. P. Moore
per Fred E. Packer
Atty.

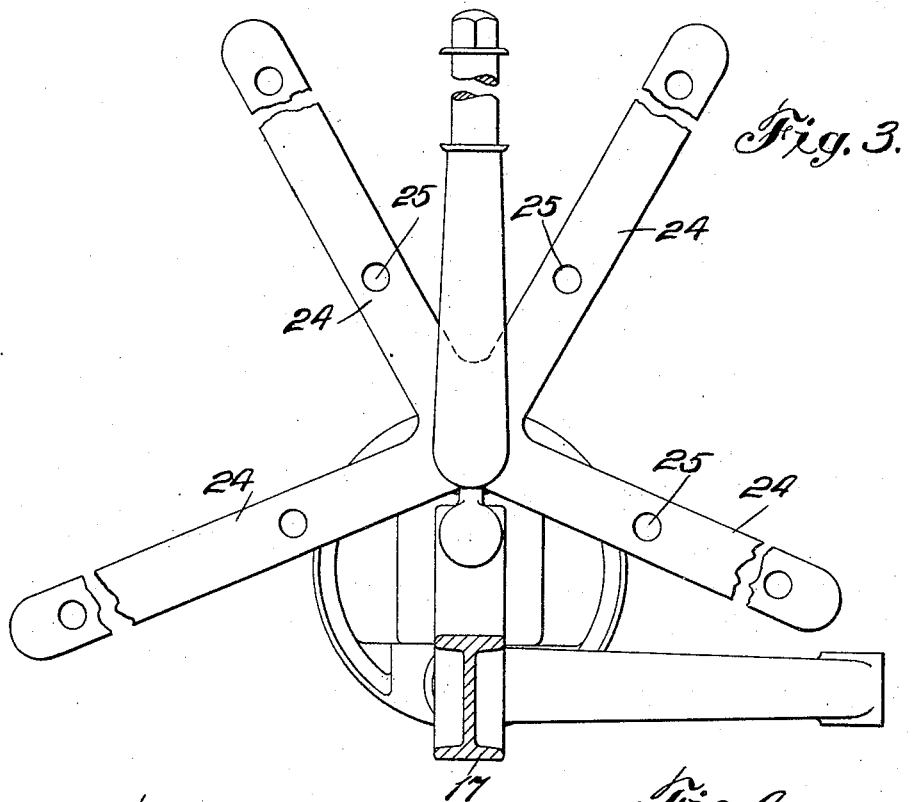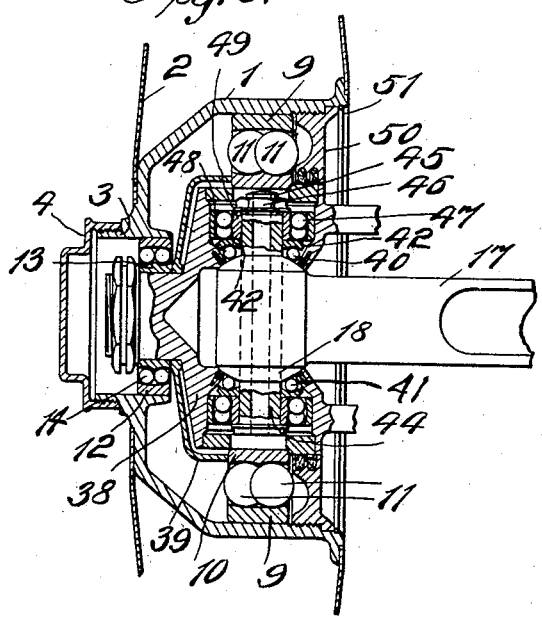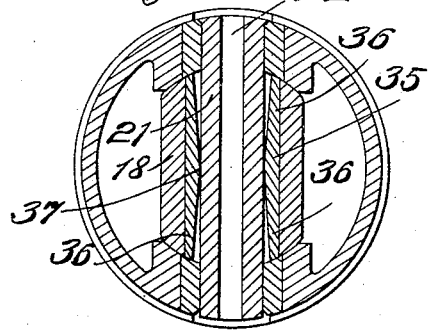

UNITED STATES PATENT OFFICE.

WILLIAM J. P. MOORE, OF NEW YORK, N. Y.

STEERING-KNUCKLE.

1,234,923.     Specification of Letters Patent.     Patented July 31, 1917.

Application filed April 28, 1916. Serial No. 94,279.

*To all whom it may concern:*

Be it known that I, WILLIAM J. P. MOORE, a citizen of the United States, residing at New York, in the county of New York and State of New York, have invented certain new and useful Improvements in Steering-Knuckles, of which the following is a specification, reference being had therein to the accompanying drawing.

This invention relates to certain new and useful improvements in steering knuckles or connections for the wheels of vehicles, more specially the front wheels of automobiles as now operated and employed. One object of the invention among many which might be mentioned is to improve and simplify the construction and combination of parts for mounting a wheel upon an axle and for steering and guiding the wheel when so mounted in order to enable it to pursue any desired even and regular course. With this and other kindred objects in view, the invention may be said to comprise numerous details and peculiarities in the construction, arrangement, and combination of the various parts, substantially as will be hereinafter described and then more particularly pointed out in the claims.

In the accompanying drawing illustrating my invention:

Fig. 3 is an elevational representation of the same with integral bracket arms employed for the purpose of supporting the mudguard which protects the adjoining mechanism and parts from being bespattered by the wheel, and also the headlight and other features;

Fig. 4 is a detail transverse section of a modification of the invention;

Fig. 5 is a detail sectional plan view of a portion of the same;

Fig. 6 is a vertical section similar to Fig. 1 showing a modification of the invention more particularly relating to the arrangement of the ball bearings between the wheel, the steering knuckle, and the axle.

Similar characters of reference designate corresponding parts throughout the different figures of the drawing.

Figure 1:
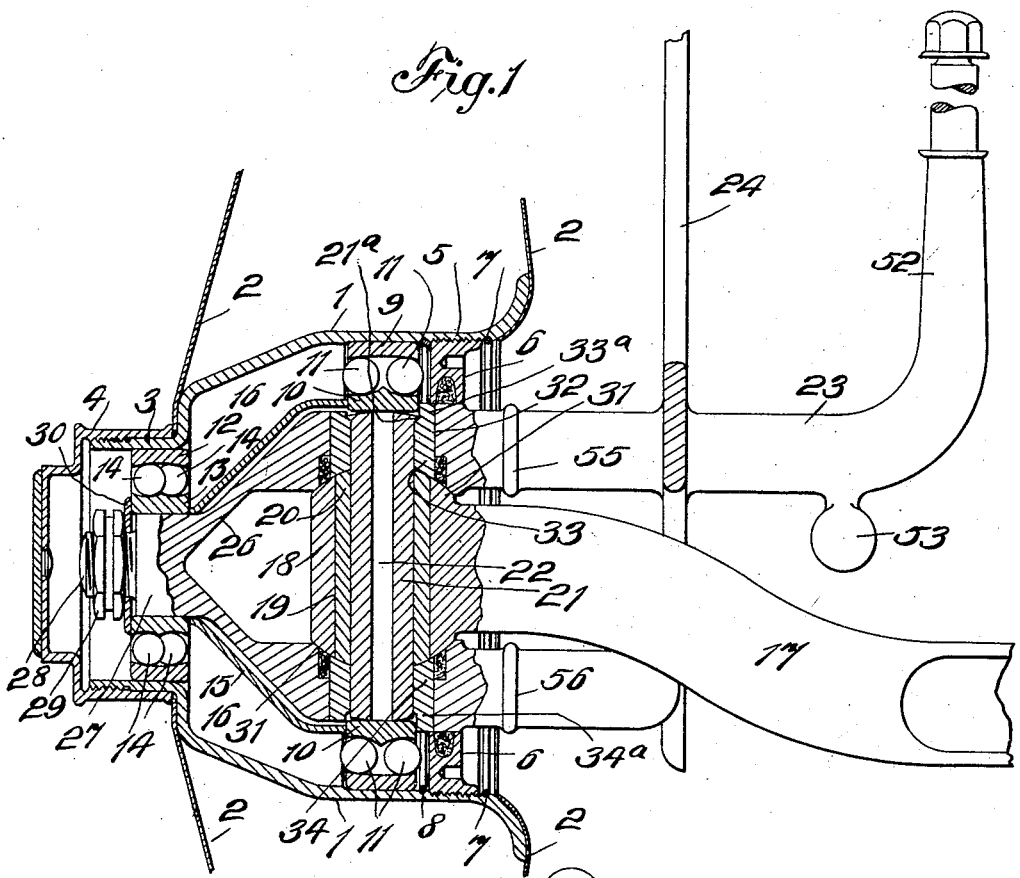
Figure 1 is a vertical sectional side elevation of my improved steering knuckle.
Figure 2:
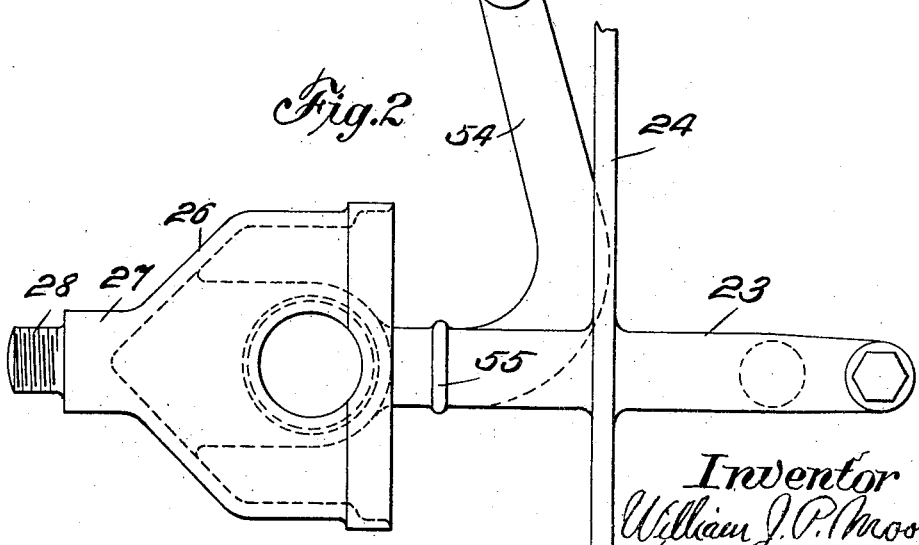
Fig. 2 is a plan view of the same.

Referring first to the wheel which I have represented here merely by way of illustration and not with any desire of restricting my invention thereto, it will be seen that it comprises the hub 1, to which the disks 2 are welded or otherwise secured, said hub 1 terminating in an externally screw-threaded cylindrical projection 3 on which screws the hub cap 4. The enlarged inner portion of the hub 1 is screw-threaded for a certain distance at 5 to receive a ring 6 held locked therein by a split wire ring 7 which is let into a groove on the inside of hub 1 adjacent to the beginning of the threaded portion 5. I also find it convenient to use another split wire ring 8 let into a circumferential groove inside of the hub 1 adjacent to the other end of the screw-threaded section 5, that is to say on the inside of the ring 6, and this wire ring 8 serves as a locking ring for the ball bearing. Also on the inside of the hub 1 is a ball bearing whose outer raceway 9 is fixed tightly within said hub 1, while its inner raceway 10 is sufficiently separated from the raceway 9 to permit a couple of rows of balls 11 to be arranged between the two raceways. I will explain shortly how the raceway 10 is supported on the steering connections. It will further be noted that the outermost ring 3 of the hub 1 is of reduced diameter as I have stated, and there is tightly placed therein a raceway 12 which holds between it and an inner raceway 13, one or more rows of balls 14, the inner raceway 13 being held by the steering or axle connections in the way I shall presently set forth. Between the ball raceway 10 and the ball raceway 13 is a conical inner wall or cover 15 held in place by these raceways and covering the end of the steering knuckle, there being between the conical wall 15 and the hub 1 a space 16 that receives any suitable lubricating grease for giving the proper lubrication to the ball bearings 11 and 14.

17 designates one end of the axle of an automobile or other vehicle, the same having a cylindrical head 18 provided with segmentally spherical ends and having therein a cylindrical bore 19 containing a sleeve or bushing 20 which receives a vertical pin 21 having therein a central passage 22, the ends of which pins 21 are in contact with the inner raceway 10 of the bearing for the balls 11, the upper end of said pin 21 being near the top of the raceway 10 and the lower end near the bottom of the raceway 10, all as clearly indicated in Fig. 1.

23 denotes an extension of the knuckle constructed in any suitable and improved design and fashioned with an upright headlight bracket 52, having knob joint 53 for the attachment of the steering lever, and also horizontal arm 54, for the attachment of the radius rod. These parts 23 and 54 are attached to the knuckle either by being forged with it or otherwise attached at 55 and 56. This knuckle extension 23 carries preferably a series of radial arms 24 that project in a vertical plane and are perforated at 25 for attachement to a mudguard or other protector for the wheel, which guard obviously turns with the wheel as I shall presently set forth, as does also the lamp bracket 52, and said knuckle extension 23 terminates in a conical-shaped forging or member 26, having at its apex a cylindrical portion 27 provided with a screw-threaded projection 28 of smaller diameter, on which is a nut 29, it being noted that the cylindrical portion 27 lies neatly within and supports the raceway 13 belonging to the balls 14 of the outer ball bearing, while the screw-threaded end 28 projects into the cavity of the hub cap 4, while the nut or locking device 29 lies within the interior of said cap and screws down tightly against a washer 30 which abuts against the ball raceway 13 and thus assists in anchoring said raceway 13 firmly between said washer 30 and the conical cover 15 hereinabove alluded to. This conical member 26 has a central cavity, in which is formed a spherical or globular seat 31, that receives the spherical ends of the head 18 of the axle with an easy working fit so that the member 26 together with the wheel may be movable on said axle around the pin 21 in one direction or the other, under the action of any means applied to the knuckle for the purpose of imparting motion thereto in one direction or the other. Furthermore the member 26 is provided with a vertical cylindrical passage at 32 above and below the spherical seat for the end 18 to receive at a point above the head 18 a sleeve or bushing 33 and at a point below said head 18, another bushing or sleeve 34, both shaped at their inner ends to conform to the curvature of the spherical ends of the head 18 so that along with the curved seat 31 they may form a neat and proper surface for the member 26, it being further noted that the sleeves 33 and 34 have lips 33$^a$ and 34$^a$ which project alongside of the inner raceway 10 and assist in holding the same firmly between said lips and the end of the conical wall 15 above alluded to, and further it should be observed that the pin 21 is provided at its upper end with an encircling peripheral lip 21$^a$, which lets into a groove or recess in the sleeve 33 contiguous to the aforesaid lip 33$^a$ and holds the latter in position after the ball bearing raceway 10 has been removed.

In Fig. 4 I have indicated a modified construction for the sleeve or bushing 20 which occupies the cylindrical passage 19 in the globular end 18 and receives within it a pin 21. When the passage through the sleeve 20 is cylindrical it is obvious that the pin 21 will entirely fill said passage and although the pin will rotate inside of the sleeve, yet it will have no other motion, and this vertical position will depend entirely upon the position of the sleeve and consequently of the head 18 and the axle 17. In Fig. 4 I show a modification consisting of the sleeve 35 located inside of the head 18 and receiving within it the pin 21 as before, all the surrounding parts being substantially the same as in Fig. 1. The sleeve 35, however, does not have a cylindrical bore through it, but a bore which flares outwardly from the middle point of the length of the sleeve with inclined or conical surfaces 36, so that the pin 21 which fits with a more or less tight fit at the center of the sleeve 35, that is to say, at the point 37, can pivot on said point and can adjust itself slightly in one direction or the other by moving into contact with the conical surface 36 above the pivotal point 37 or the conical surface 36 below said point, the possiblities of such movement being clearly indicated in the sectional view of Fig. 4. The pin 21 in the sleeve is however always in contact throughout its entire length in a vertical transverse plane, the same as it is shown in Fig. 1, these contact lines being indicated in Fig. 5. By this arrangement and combination of parts the hub of the wheel can make a partial rotation in the direction of its axis of rotation, transferring the point of contact of the wheel with the ground to a point slightly to the rear or in front of the vertical or normal plane of the pin of the axle, producing in effect the same result as an ordinary caster, that is, there is a drag so to speak to the wheel, and any road obstacle or resistance tends to keep the wheel in its plane of rotation, making it easier to steer and also prevents wabbling. It is a well known fact in automobile construction that when the point of wheel contact with the ground is in advance of the vertical plane through the pin of axle (in the direction in which it is moving) any unevenness in the ground causes excessive wabbling and severe strains in the steering mechanism, and also excessive tire wear. It is, therefore, common practice to give the axle pin a slight incline forward from the vertical, which, while it may correct this tendency to wabble when the car is moving in one direction, this in reality increases this tendency when moving in the opposite direction. Further, owing to the fact that the axle is attached to the flexible spring, fixed at one end and jointed at the other, the plane of the axle pin is constantly changing, therefor the drag or caster effect and the end desired is not obtained. This new arrangement of mine by giving the axle pin a slight freedom of motion in the direction of wheel rotation, entirely overcomes this defect, gives a drag or caster effect in either direction automatically, at the same time holding the wheel firmly in the transverse plane as the axle pin is always in contact with the hub bushing throughout its entire length. On the other hand the pin in the plane of rotation (or front and back) is always in contact with the bushing at its center at least, and as soon as any motion is given the car, the resistance of the wheel on the ground causes the partial rotation of the hub, and the axle pin is brought into contact with the bushing along the inclined conical surface throughout its entire length and this condition exists unchanged until there is a reversal of direction in the direction of motion of the car, the pressure on the bushing being exerted on the top forward side and rear lower side (assuming forward motion of car) and automatically adjusts itself to any slight movement of plane of the axle pin due to spring movement without losing its caster effect.

In the sectional view of Fig. 6, which is similar in many respects to the sectional view in Fig. 1, I have shown a modification in the construction and arrangement of many parts, such modification consisting mainly in the use of additional ball bearings. In this combination we have the same hub 1, disks 2, and cap 4 screwing upon the screw-threaded cylindrical part 3 of the hub 1; also we have the shaft 17 with its spherical end 18 which is carried in the recess in the knuckle 38 which corresponds to knuckle 26, a portion of said knuckle 38 being covered by the inner cap 39 so as to provide grease containing recesses between said cover 39 and the wall of the hub 1. I also have here an outer ball bearing consisting of raceway 12, balls 14, and raceway 13.

Around the globular end 18 of the shaft 17 I place a couple of ball bearings, consisting in one case of a series of balls 40 and in the other case of a series of balls 41, the balls 40 being held against the face of the head 18 by a thrust raceway 42, and the balls 41 being held against the head 18 by a similar raceway 42, said raceways 42 being located in close contact with a pin 44 which is similar to the pin 21, but has its upper end screw-threaded at 45 and provided with a nut 46. Around the thrust raceway 42 is an annular ball bearing consisting of a couple of rows of balls 47, an outer raceway 48, and an inner raceway 49, the latter surrounding the pin 44. Also, it will be observed that I use in this combination the same ball bearing as I do in Fig. 1 consisting of a raceway 9, balls 11 and raceway 10, the raceway 9 being fast in the hub 1 and the raceway 10 being stationary on the knuckle 38. These various ball bearings which I have just explained which surround and function in connection with the hub and the axle head and contiguous parts are kept in place by a ring 50 which screws into the hub 1 and is locked therein by means of the split locking ring 51, all as clearly indicated in Fig. 6.

The operation of a steering knuckle similar to that which I have just described, together with its modifications will be palpable from the description given without the need of any additional detail. It will be seen that the steering device turns the wheel about in any desired plane and carries with it the mudguard and other parts. As the wheel is thus guidable by revolving on a vertical pivot, it can be easily turned in a very small space and whichever direction it takes the mudguard carried by the arms 24 fixed to the knuckle device 23 will go with it, covering the wheel in the same manner at all times and performing its function in a useful way. All the parts can be easily assembled and disassembled whenever required, and the various ball bearings, placed as they are, enable the movement to be smooth and almost frictionless. When the pin 21 on which the wheel swivels has conjoined thereto the inclined faced sleeve or bearing 35 it will be seen that the movement of the wheel either forward or back will be accurately guided since the pin 21 will contact with the upper forward conical surface 36 and the lower rear conical surface 36, or vice versa, thus throwing the ground contact of the wheel behind the plane of axle pin of the hub in the direction in which it is moving, so that any increased road resistance will tend to prevent any deflection from a proper line forward or backward as a true caster effect is maintained under all conditions.

Of course, I can use the form shown in Fig. 4 or dispense with it, as I may prefer according to whatever conditions exist, and I reserve the liberty of employing whichever form is best for the particular case.

Then again the form shown in Fig. 6 is adopted for a great many uses and subserves many valuable results because of the multiplicity of the ball bearings and a consequent easy movement of the steering knuckle in any desired plane, affording thereby a corresponding easy motion in the operation of the wheel. It should furthermore be noted that the combination parts illustrated in Fig. 6 allow a very easy assembling and disassembling for repairs, lubrication, and other purposes.

Many changes may be made in the exact character of the various parts of the invention and the relative arrangement of the same without exceeding the scope of my invention, and I therefore reserve the liberty of making all such changes consistent with the form and character of the appended claims as may be found to be desirable and successful in practice.

Having thus described my invention, what I claim as new and desire to secure by Letters Patent, is:

1. In a steering mechanism, the combination of an axle having a cylindrical head formed with segmental spherical ends, a knuckle having a recess for holding said head and formed with segmentally spherical seats, a pin passing through the head of the axle and said knuckle, said pin allowing an adjustable movement in the plane of rotation of the wheel but preventing any lateral movement of the wheel, and a wheel and its hub mounted upon said knuckle and turning therewith.

2. The combination of a wheel and its hub, a steering knuckle having a part thereof lying within the hub, a headlight bracket on the steering knuckle having a knob joint and also a horizontal arm for connection with the steering devices, and said knuckle provided also with a series of radial arms for supporting the wheel protecting member and other parts.

3. The combination of an axle having a head provided with a passage, a conical-faced sleeve located in said passage, the conical faces thereof being above and below the center, a cylindrical pin passing through said sleeve, and a steering knuckle engaged by said pin above and below the head, together with a hub carried revolubly upon the steering member.

4. The combination of an axle having a globular head provided with a vertical passage, a double conical-faced member located in said passage, the conical faces being above and below the center, a cylindrical pin located in said sleeve and in pivotal contact with the central portion thereof between the conical faces, a steering knuckle engaged above and below the globular head by the said pin, and a wheel and its hub, together with ball bearings whereby the said hub is mounted upon the steering knuckle and is adjustable therewith.

5. In a steering mechanism, the combination of an axle, a knuckle, means for connecting them, including a pin and a cone-faced sleeve allowing an adjustable movement in the plane of rotation of the wheel but preventing any lateral movement of the wheel.

6. The combination of an axle having a cylindrical head formed with segmentally spherical ends, a knuckle having a recess for holding said head and formed with segmentally spherical seats, a pin passing through the head and knuckle, and a sleeve surrounding the pin on the center of which the pin is fulcrumed, said sleeve having conical faces above and below the fulcrum.

7. In a steering mechanism, the combination of an axle having a head provided with a vertical passage, a knuckle having a spherical recess receiving said head of the axle, a pin passing through the end of the axle and said knuckle, a wheel and its hub mounted upon said knuckle and turning therewith, ball bearings interposed between the hub and the knuckle, one of which is opposite to the pin while another is opposite to the outer end of the knuckle, a casing surrounding the knuckle between the ball bearings and spaced from the hub, a ring within the hub for holding the several parts in position, a sleeve within the axle head surrounding the pin, said sleeve having segmentally spherical ends, and sleeves in the knuckle above and below the other sleeve and surrounding the upper and lower ends of the pin, said last mentioned sleeves having segmentally spherical seats in contact with the segmentally spherical ends of the sleeve within the axle head surrounding the pin.

8. In a steering mechanism, the combination of an axle having a cylindrical head formed with segmentally spherical ends, a knuckle having a recess for holding said head and formed with segmentally spherical seats and also with a cone-shaped portion terminating in a projection of smaller diameter than the main portion of the knuckle, a pin passing through the head and knuckle, a sleeve within the axle head surrounding the pin, said sleeve having segmentally spherical ends, sleeves within the knuckle surrounding the upper and lower ends of the pin, said sleeves having segmentally spherical seats in contact with the ends of the sleeve in the axle head, said last mentioned sleeves being recessed to accommodate the pin, ball bearings between the hub and the knuckle, one of which is opposite to the pin while the other is opposite to the reduced outer end of the knuckle.

9. In a steering mechanism, the combination of an axle having a cylindrical head formed with segmentally spherical ends, a knuckle having a recess for holding said head and formed with segmentally spherical seats, a pin connecting them which allows an adjustable movement in the plane of rotation of the wheel but prevents any lateral movement of the wheel.

In testimony whereof I affix my signature.

WILLIAM J. P. MOORE.

Copies of this patent may be obtained for five cents each, by addressing the "Commissioner of Patents, Washington, D. C."